United States Patent
Takai

[11] Patent Number: 6,115,335
[45] Date of Patent: Sep. 5, 2000

[54] REPRODUCTION APPARATUS FOR DISK-LIKE RECORDING MEDIUM

[75] Inventor: Kazumasa Takai, Kakamigahara, Japan

[73] Assignee: Sanyo Electric Co., Ltd., Osaka, Japan

[21] Appl. No.: 09/035,664

[22] Filed: Mar. 5, 1998

[30] Foreign Application Priority Data

Mar. 6, 1997 [JP] Japan .................................. 9-051886

[51] Int. Cl.⁷ .................................................. G11B 7/00
[52] U.S. Cl. .................................... 369/44.32; 369/44.28; 369/44.29
[58] Field of Search ........................... 369/44.32, 44.27, 369/44.28, 44.29, 44.34, 44.35, 44.33, 32

[56] References Cited

U.S. PATENT DOCUMENTS 5,245,597  9/1993  Lee et al. ............................. 369/44.28
5,757,746  5/1998  Matsui ................................. 369/44.28
5,761,164  6/1998  Abe et al. ........................ 369/44.29 X

*Primary Examiner*—Muhammad Edun
*Attorney, Agent, or Firm*—Sheridan Ross P.C.

[57] ABSTRACT

A disk-like recording medium, such as a compact disc, stores information on tracks recorded on the disc surface. A spindle motor rotates the disc and a read unit, which moves in a radial direction in relation to the disc, reads the stored information off of disc. Servo control of the spindle motor and movement of the read unit is controlled by a control circuit, which acts in response to a recording track detection signal. Servo control of the movement of the read unit is further controlled by a mute circuit, which only allows the read unit to be moved when a control signal generated by the control circuit is above a predetermined voltage level. Limiting when the read unit is driven conserves power.

4 Claims, 4 Drawing Sheets

REPRODUCTION APPARATUS FOR DISK-LIKE RECORDING MEDIUM

BACKGROUND OF THE INVENTION

The present invention relates generally to a reproduction apparatus for a disk-like recording medium and, more particularly, to a reproduction apparatus capable of reducing power dissipation.

Disk-like high density recording media such as an optical disks, CDs (Compact Disks) and mini disks, have recording tracks provided in a spiral form, where information is recorded outwardly starting from the innermost recording track on the disk. A reproduction apparatus for such a disk-like recording medium is equipped with a semiconductor laser which irradiates a laser beam on a target recording track on the disk, and reproduces information by detecting the reflected laser beam.

The reproduction apparatus further comprises a pickup, which focuses the laser beam on the recording track and acquires the reflected light, and a spindle motor which spins the disk. The pickup has a sled capable of moving roughly in the radial direction of the disk, traversing the recording tracks, and a photosensor which is provided on the sled and is slightly movable by an actuator. The photosensor has a laser diode (semiconductor laser). The reproduction apparatus controls the actuator to accomplish tracking servo and focus servo functions. In the tracking servo, the photosensor slightly moves in the radial direction of the disk to irradiate the laser beam on a desired recording track. In the focus servo, the photosensor moves up and down to focus the laser beam on the target recording track. The reproduction apparatus further performs a spindle servo function which controls the spindle motor to rotate the disk at a constant linear velocity.

Access to disk information or irradiation of the laser beam on the target recording track is controlled based on the result of detection of the reflected laser beam according to the movement of the pickup. That is, focus servo, sled servo and tracking servo functions are executed while turning the disk and irradiating the laser beam from the photosensor. At this time, the number of times the laser beam crosses the recording tracks is counted (track counting) based on the result of detection of the reflected laser beam. In accordance with the track counting and position information of the innermost recording track, the sled servo and tracking servo control the irradiation position of the laser beam. Thus, access the disk information, sled servo, tracking servo and focus servo functions and irradiation of the laser beam from the photosensor are performed.

The sled motor, which is used to move the sled, starts rotating when an applied voltage reaches an activation voltage V1 due to a tracking error, as shown in FIG. 1. When a voltage within the hatched areas in FIG. 1 is applied to the sled motor, therefore, the sled motor does not start rotating. Application of such a voltage to the sled motor thus increases power consumption. For a reproduction apparatus which uses a battery as the system power supply, particularly, the battery life becomes shorter.

Accordingly, it is an object of the present invention to provide a reproduction apparatus for a disk-like recording medium having decreased power dissipation.

SUMMARY OF THE INVENTION

Briefly stated, the present invention provides a reproduction apparatus for a disk-like recording medium having recording tracks with information recorded thereon. The apparatus including: a reading unit for reading information recorded on said recording tracks and outputting a read signal; a first movable unit for moving said reading unit in a first moving range in a radial direction of said disk-like recording medium; a second movable unit for moving said reading unit in a second moving range, narrower than said first moving range, in said radial direction of said disk-like recording medium to more precisely track a target recording track; a control circuit for producing a tracking error signal for controlling said second movable unit in accordance with said read signal from said reading unit, and producing from said tracking error signal a control signal for controlling said first movable unit; and a mute circuit for muting said control signal from said control circuit in a predetermined period to thereby generate a new control signal for controlling said second movable unit.

The present invention provides a reproduction apparatus for a disk-like recording medium having recorded tracks of information thereon. The apparatus comprising: a spindle motor for rotating the recording medium; a reading unit including a pickup for reading the recorded information of the recording medium and a photosensor for generating a recording track detection signal; a sled motor for moving the reading unit in a radial direction of the recording medium; a control circuit generating a first control signal in response to the detection signal for performing servo control on the spindle motor and generating a second control signal in response to the detection signal; and a mute circuit receiving the second control signal and producing a new second control signal therefrom, the new second control signal having a voltage equal to or higher than a reference voltage, wherein the new second control signal is used to perform servo control on the sled motor.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
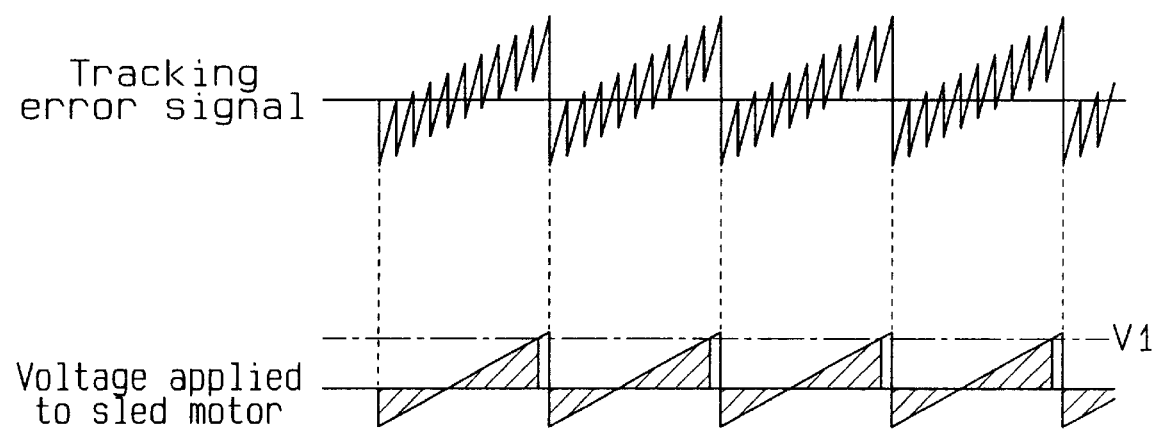
FIG. 1 is a waveform diagram of a voltage applied to a conventional sled motor.
Figure 2:
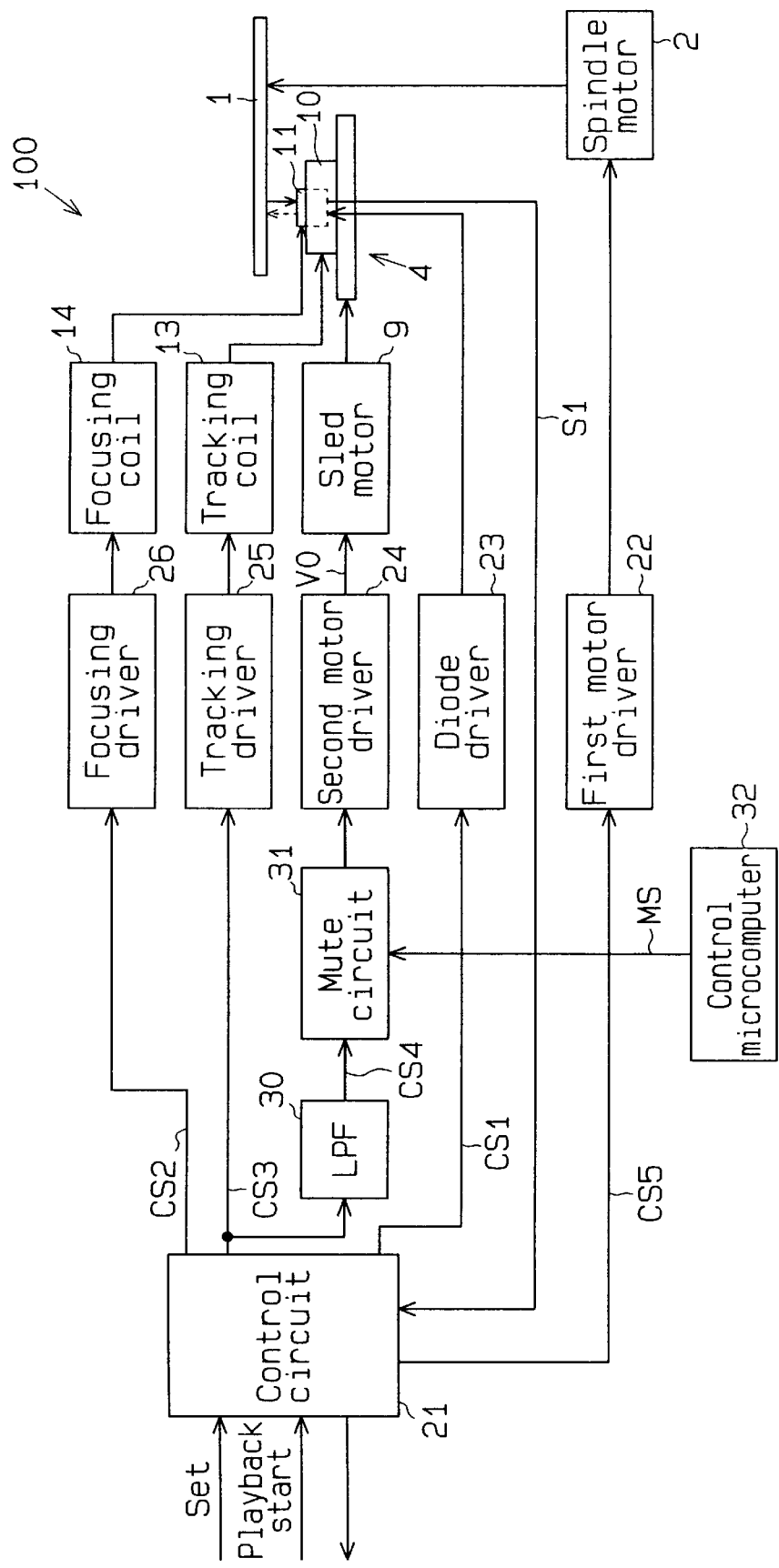
FIG. 2 is a schematic block diagram of a disk reproduction apparatus according to one embodiment of the present invention.
Figure 3:
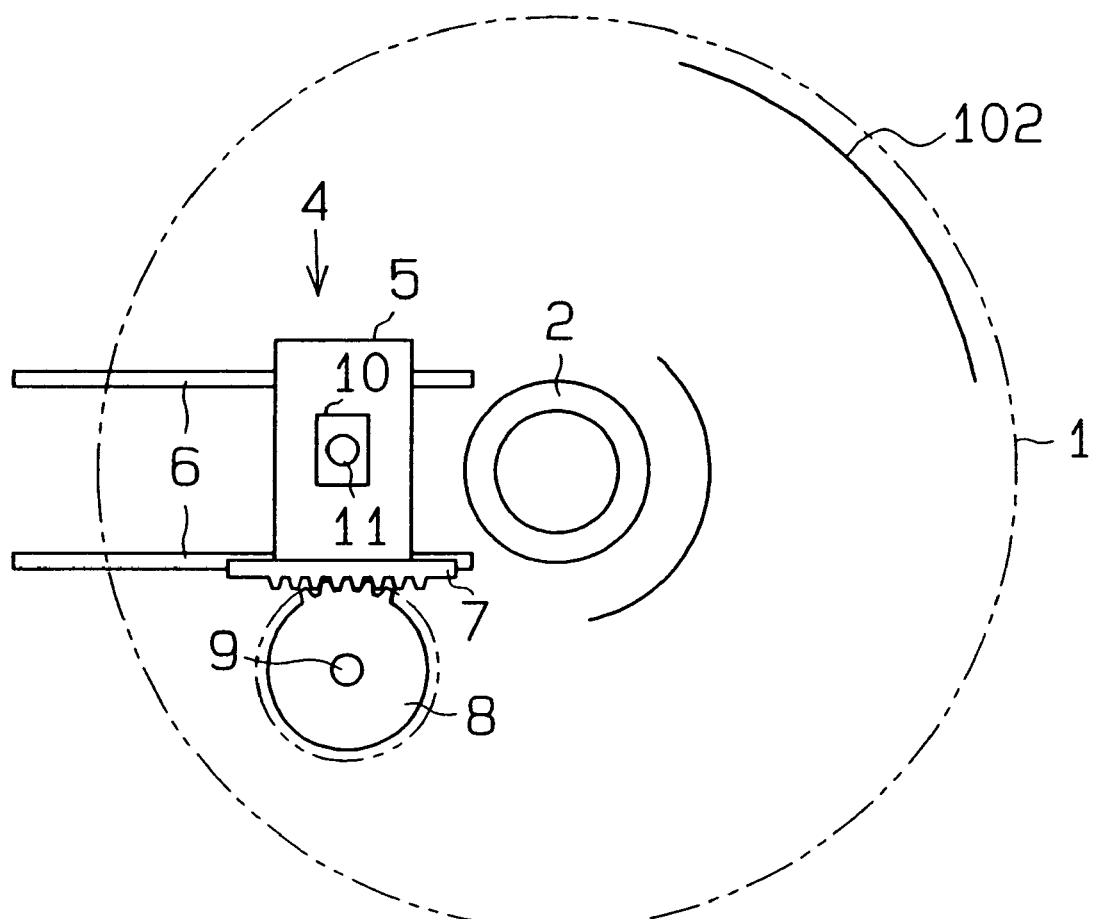
FIG. 3 is a schematic plan view of a pickup of the reproduction apparatus in FIG. 2.

FIG. 2 is a schematic block diagram of a compact disk (CD) reproduction apparatus 100 according to one embodiment of the present invention, and FIG. 3 is a schematic plan view of a disk 1 and a pickup 4.

As shown in FIG. 3, recording tracks 102 are formed spirally on the surface of the compact disk 1, with plural pieces of information, such as musical information, recorded from the innermost recording track toward the outermost recording track. The disk 1 is spun by a spindle motor 2. Servo control of the spindle motor 2 is performed by a control circuit 21 (FIG. 2) in accordance with a detection signal S1 from a photosensor 11.

The pickup 4, located directly under the disk 1, acquires information from the disk 1. The pickup 4 has a sled 5. The photosensor 11 is provided on the sled 5. The sled 5 is supported on a pair of guide rails 6 to be movable in the radial direction of the disk 1 or across the recording tracks 102. A rack 7, which is provided on one side of the sled 5, is engaged with a pinion 8 fixed to a shaft of a sled motor 9. As the sled motor 9 rotates, the sled 5 moves in the radial direction of the disk 1 along the guide rails 6. Servo control of the sled 5 is performed by the control circuit 21 in accordance with the detection signal S1 from the photosensor 11. When reproduction is stopped, the sled 5 moves to the innermost position on the disk 1 and stops there.

The photosensor 11, which has a laser diode (semiconductor laser), is mounted on an actuator 10. As shown in FIG. 2, the actuator 10 has a tracking coil 13 and a focusing coil 14. The tracking coil 13 moves the photosensor 11 in the radial direction of the disk 1 so that a laser beam is irradiated on a desired recording track in accordance with the tracking servo control by the control circuit 21. Tracking servo control is performed more precisely by the sled servo control. The focusing coil 14 moves the photosensor 11 up and down (in relation to the disk 102) so that a laser beam is focused on a target recording track in accordance with the focus servo control by the control circuit 21. The photosensor 11 detects the reflected laser beam from the recording track and outputs the detection signal S1 corresponding thereto.

The control circuit 21, connected to the photosensor 11, receives a set signal including a music piece to be reproduced a playback order, and a playback start signal, which come from an input device (not shown). In response to the playback start signal, the control circuit 21 generates control signals for the pickup 4 and the spindle motor 2 in accordance with the set signal and the detection signal S1.

More specifically, to access the music information according to the playback order in the set signal, the control circuit 21 generates and sends a control signal CS1 to a diode driver 23. In response to the control signal CS1, the diode driver 23 sends an output signal to the laser diode to emit a laser beam. The control circuit 21 also generates and supplies a control signal CS2 for focus servo control to a focusing driver 26 to excite the focusing coil 14. To carry out tracking servo control, the control circuit 21 produces a tracking error signal CS3, shown in FIG. 4, in accordance with the detection signal S1 and sends it to a tracking driver 25 to excite the tracking coil 13. In response to the servo controls CS1–SC3, the control circuit 21 sends a control signal CS5 to a first motor driver 22 to rotate the spindle motor 2 for spindle servo control.

Figure 4:
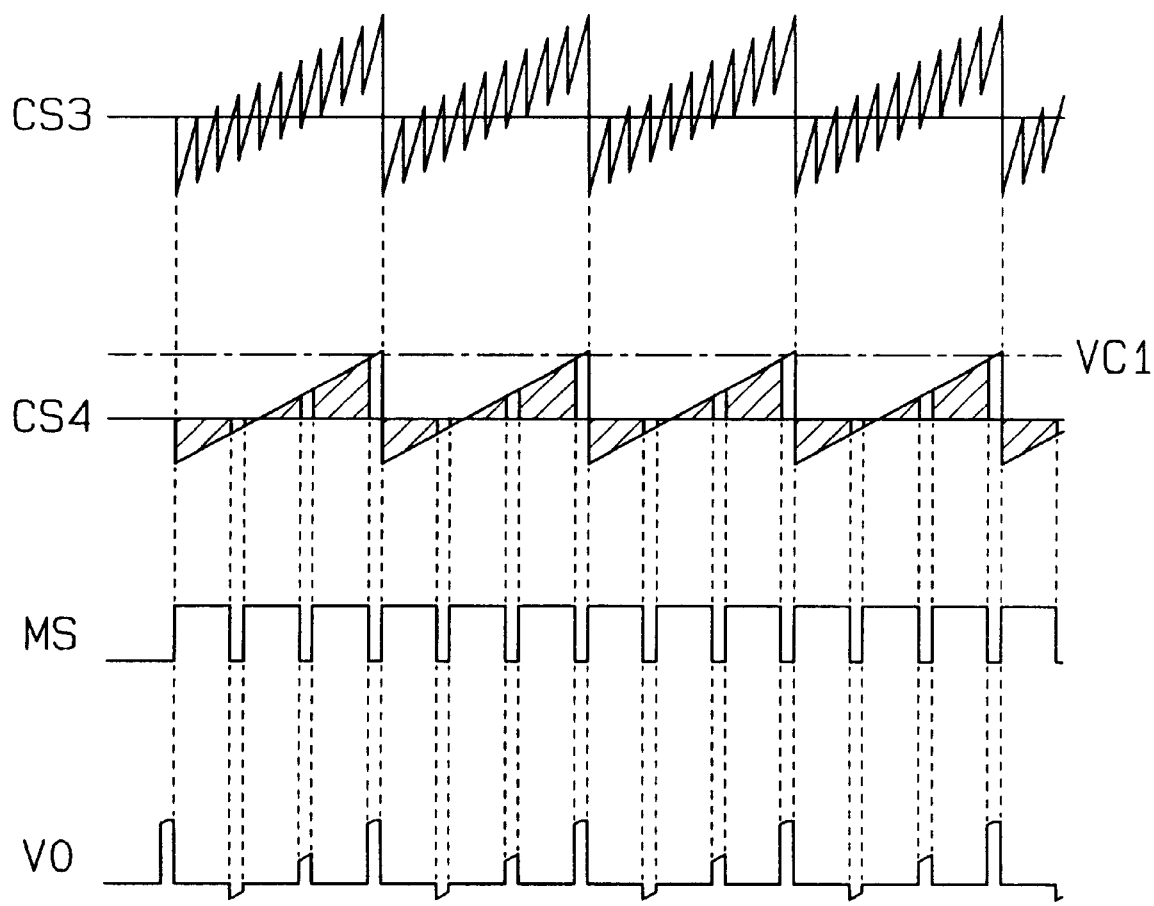
FIG. 4 is a waveform diagram of a voltage applied to the sled motor of the present invention and signals associated with the applied voltage.

A low-pass filter (LPF) 30 smoothes the tracking error signal CS3 to produce a control signal CS4, shown in FIG. 4. A mute circuit 31 receives the control signal CS4 from the LPF 30 and receives from a control microcomputer 32 a mute signal MS which has a frequency according to an arbitrary duty ratio, as shown in FIG. 4. The mute circuit 31 preferably includes an analog switch for passing the control signal CS4 in accordance with the mute signal MS to a second servo motor driver 24. The mute circuit 31 may include a logic circuit which outputs a logic signal upon reception of the mute signal MS and control signal CS4. When the control signal CS4 has a voltage equal to or higher than a reference voltage VC1, the voltage permits the sled motor 9 to initiate its activation. While the mute signal MS has a predetermined level (L level in this case), the mute circuit 31 sends the control signal CS4 to the second motor driver 24. The second motor driver 24 applies a voltage V0 of the control signal CS4 to the sled motor 9.

The control circuit 21 outputs a music information playback signal in accordance with the detection signal S1 from the photosensor 11. The control circuit 21 counts the number of times the laser beam crosses the recording tracks (track counting). In accordance with the track counting and position information of the innermost recording track, the control circuit 21 produces a rotation control signal CS5. The control signal CS5 is sent to a first motor driver 22, which sets the linear velocity of the recording track.

The mute circuit 31 mutes the control signal CS4 for activating the sled motor 9 using the mute signal MS having the proper frequency such that parts of the control signal CS4, indicated by hatching lines in FIG. 4, are not supplied to the second motor driver 24. Thus, the second motor driver 24 does not apply wasteful voltage, which cannot activate the sled motor 9, to the sled motor 9. This reduces the power consumption of the sled motor 9 and elongates the battery life in a CD reproduction apparatus which uses a battery as the system power supply.

It should be apparent to those skilled in the art that the present invention may be embodied in many other specific forms without departing from the spirit or scope of the invention. For instance, the mute circuit 31 may be designed such that the circuit 31 compares the voltage of the control signal CS4 with a reference voltage, mutes the control signal CS4 when its voltage is lower than the reference voltage, and supplies the control signal CS4 to the second motor driver 24 when the former voltage is equal to or higher than the reference voltage. The present invention may be adapted to a reproduction apparatus for a disk-like recording medium such as an optical disk, mini disk or digital video disk. Therefore, the present examples and embodiment are to be considered as illustrative and not restrictive and the invention is not to be limited to the details given herein, but may be modified within the scope and equivalence of the appended claims.

What is claimed is:

1. A reproduction apparatus for a disk-like recording medium having recording tracks with information recorded thereon, comprising:

a reading unit for reading information recorded on said recording tracks and outputting a read signal;

a first movable unit for moving said reading unit in a first moving range in a radial direction of said disk-like recording medium;

a second movable unit for moving said reading unit in a second moving range, narrower than said first moving range, in said radial direction of said disk-like recording medium to more precisely track a target recording track;

a control circuit for producing a tracking error signal for controlling said second movable unit in accordance with said read signal from said reading unit, and producing from said tracking error signal a control signal for controlling said first movable unit; and a mute circuit for muting said control signal from said control circuit in a predetermined period to thereby generate a new control signal for controlling said second movable unit.

2. The reproduction apparatus according to claim 1, wherein said mute circuit mutes said new control signal produced by said mute circuit has a predetermined frequency according to an arbitrary duty ratio.

3. A reproduction apparatus for a disk-like recording medium having recorded tracks of information thereon, the apparatus comprising:

a spindle motor for rotating the recording medium;

a reading unit including a pickup for reading the recorded information of the recording medium and a photosensor for generating a recording track detection signal;

a sled motor for moving the reading unit in a radial direction of the recording medium;

a control circuit generating a first control signal in response to the detection signal for performing servo control on the spindle motor and generating a second control signal in response to the detection signal; and a mute circuit receiving the second control signal and producing a new second control signal therefrom, the new second control signal having a voltage equal to or higher than a reference voltage, wherein the new second control signal is used to perform servo control on the sled motor.

4. The reproduction apparatus of claim 3, further comprising:

a low pass filter connected between the control circuit and the mute circuit for smoothing the second control signal, wherein the mute circuit generates the new second control signal from the smoothed second control signal.

* * * * *